United States Patent [19]

Baumeister

[11] Patent Number: 4,652,939
[45] Date of Patent: Mar. 24, 1987

[54] DISK CONTAINER SUPPORTING A DETEACHABLE MEMORY

[75] Inventor: Hans-Peter Baumeister, Churchville, N.Y.

[73] Assignee: Eastman Kodak Company, Rochester, N.Y.

[21] Appl. No.: 644,097

[22] Filed: Aug. 24, 1984

[51] Int. Cl.$^4$ .................. G11B 23/03; G11B 23/34
[52] U.S. Cl. ............................... 358/342; 360/133; 360/69; 369/34; 369/38
[58] Field of Search ............... 358/342, 335, 906; 360/69, 71, 92, 98, 132, 133; 369/30, 32, 34, 38, 36; 353/120

[56] References Cited

U.S. PATENT DOCUMENTS

| | | | |
|---|---|---|---|
| 3,724,935 | 4/1973 | Batter, Jr. ............................... | 352/38 |
| 3,825,730 | 7/1974 | Worthington et al. ............... | 340/700 |
| 3,973,842 | 8/1976 | Woerner ................................ | 353/19 |
| 4,009,331 | 2/1977 | Goldmark et al. ................... | 360/35.1 |
| 4,075,669 | 2/1978 | Louzil et al. ......................... | 360/92 |
| 4,132,469 | 1/1979 | Harvey .................................. | 353/25 |
| 4,210,785 | 7/1980 | Huber et al. ......................... | 369/30 |
| 4,210,940 | 7/1980 | Prysby et al. ........................ | 360/33.1 |
| 4,224,644 | 9/1980 | Lewis et al. .......................... | 360/72.2 |
| 4,270,150 | 2/1981 | Diermann ............................. | 360/35.1 |
| 4,271,489 | 6/1981 | Siryj et al. ............................ | 369/38 |
| 4,272,167 | 6/1981 | Kempster ............................. | 353/120 |
| 4,338,644 | 7/1982 | Staar ..................................... | 360/69 |
| 4,383,285 | 5/1983 | Staar ..................................... | 360/132 |
| 4,527,262 | 7/1985 | Manto .................................. | 369/34 |
| 4,539,663 | 9/1985 | Ishibashi et al. .................... | 369/34 |
| 4,545,550 | 10/1985 | Wolf et al. ......................... | 360/132 |
| 4,573,084 | 2/1986 | Iida ...................................... | 369/32 |
| 4,608,679 | 8/1986 | Rudy et al. ......................... | 369/34 |

FOREIGN PATENT DOCUMENTS 0886928 4/1981 Belgium .
2312598 9/1974 Fed. Rep. of Germany .
3034586 2/1982 Fed. Rep. of Germany .
1402777 5/1965 France .
2079793 11/1971 France .
2064260 6/1981 United Kingdom .
2102184 1/1983 United Kingdom .

OTHER PUBLICATIONS

Patent Abstracts of Japan, vol. 8, No. 208, (p. 302), (1645), 21 Sep. 84, JP.A. 5992474 (Olympus), 5-28-84.
IEEE Transactions on Communications, vol. COM-31, No. 2, 2-83, Gordon, "An Interactive Video Information Terminal".
Toute l'Electronique, No. 467, Oct. 1981, Paris, Fr., pp. 6 & 7, "Quand l'Electronique Revolutionne la Photographie".
Research Disclosure 19953, (Nov. 1980).
"Electronic Still Camera", Kihara, N. et al, Journal of Applied Photographic Engineering, vol. 9, No. 5, Oct. 1983, 159-163.
"The Electronic Still Camera a New Concept in Photography" by Kihara, N. et al, IEEE Trans. on Consumer Electronics, vol. CE-28, No. 3, Aug. 1982, 325-330.

Primary Examiner—Raymond F. Cardillo
Assistant Examiner—Robert A. Weinhardt
Attorney, Agent, or Firm—David M. Woods

[57] ABSTRACT

A removable container holds a plurality of video disks each storing prerecorded video pictures that are played back in a multi-disk video player. The container includes a magazine for storing the disks and a nonvolatile, erasable memory supported adjacent the magazine between guide rails formed on one side of the magazine. The memory is locked in place on the rails when the container is outside the player by a movable locking key that is biased into a locking slot in the magazine. When the container is inserted into the player, the locking key is displaced out of the slot; the memory is detached from the magazine and connected into the player circuit, thus permitting movement of the magazine without disturbing transfer of data to and from the immobilized memory.

7 Claims, 14 Drawing Figures

DISK CONTAINER SUPPORTING A DETEACHABLE MEMORY

BACKGROUND OF THE INVENTION

Cross Reference To Related Application(s)

This patent application is related to commonly assigned, copending patent application Ser. No. 644,096, entitled "Video Disk Apparatus Providing Organized Picture Playback", filed on even date herewith.

FIELD OF THE INVENTION

The invention pertains to a container for storing a plurality of data-containing disks that are accessed by a disk player, and especially to a container for a plurality of video disks each storing a series of prerecorded pictures that are played back in a video disk player.

DESCRIPTION RELATIVE TO THE PRIOR ART

A collection of pictures is typically stored in an album or a slide tray. More recently, a video disk has been proposed as a storage medium for still pictures. The form of the picture is different in each case: color prints are placed in the album; color transparencies are stored in the slide tray; and video signals are recorded on the video disk. Color prints are manually arranged in the album and viewed directly without any mechanized intervention. Color slides require manual arrangement in the slide tray but offer greater opportunity for mechanized viewing. In this connection, a combination of an ordinary tape cassette and a slide tray has been suggested to control the slide sequence, length of projection, repetition of the pictures, dissolve effects and so on (Research Disclosure Item No. 19953, Nov. 1980, p. 474-475). The necessary control signals are prerecorded on the tape.

Video still imaging is a recent proposal that offers the amateur photographer a display system with features analogous to a collection of prints or slides. A typical video still camera uses a small magnetic disk as its memory device (see "Electronic Still Camera" by Kihara, N. et al. *Journal of Applied Photographic Engineering*, Vol. 9, No. 5, October 1983, 159-163). A companion player is envisioned which, when a recorded disk is inserted into it, converts the signals recorded on the disk into a television signal. Each disk may store not only a number of still pictures but certain picture-related data, such as the time allotted to viewing each picture, the order of viewing, titles and text. (Such picture-related data may be contained with each picture on the picture track or on one or more special tracks on the disk.) Most video players will have digital processing capability—usually in a microcomputer and its programs. By processing the picture-related data from the disk, the player can provide customized, and automatic, picture viewing limited to pictures collected on that disk.

Picture collections are often relatively small and are contained in one place: up to 140 slides in one tray, or 50 pictures on one video disk are typical examples. Organizing larger collections of pictures into an integrated assemblage presents a new set of problems. For storing large collections of color prints and color slides, there is little alternative other than shelves full of albums or closets stacked with slide trays. However, video disks, being quite compact, are more easily grouped and stored for mechanized viewing. In the case of a typical multi-disk player, a container of, for example, 30 disks is inserted into the player, which is adapted to remove a selected disk and display its pictures. Each video disk contains, for example, 25 full-frame pictures or 50 single field pictures on concentric tracks. The player then can access as many as 1500 pictures from such a container. The capacity of such a container is easily equivalent to many picture albums (or slide trays).

The storage of picture-related data corresponding to such a large number of video pictures becomes a significant operational problem. Having the data on the individual disks is unsatisfactory because of the time necessary to initially cycle through the disks to assemble the data and to determine, for example, the order of viewing. The time involved—time to load each disk from the magazine to the player, time to bring each disk up to speed and position a playback head, and time to unload each disk—easily amounts to sixty or more seconds delay in "getting the show started". Such lost time prevents the multi-disk player from becoming a truly viewer-interactive system, that is, one which is directly and quickly cooperative with the instructions of the viewer, especially at start-up.

SUMMARY OF THE INVENTION

The necessity of cycling through a magazine to assemble or store picture-related data is eliminated according to the invention by not only storing the data in a memory where it can be immediately incorporated into the player circuit but also by maintaining the memory on-line with the player circuit irrespective of movement of the magazine, even movement so great as to completely disassociate the magazine from the memory. Data transfer to and from the memory then becomes synchronous with requirements of the viewer. Data assembly is transparent to the viewer and not conditioned by annoying mechanical requirements (i.e., repetitive cycling) that impede use of the player.

According to the invention, a container is provided for holding a plurality of magnetic disks each storing data that is read and processed by a playback circuit in a magnetic disk player. The container includes a magazine and a memory device supported adjacent the magazine; the magazine contains the disks and the memory device accompanies the magazine whether in or out of the player. The container also includes means attaching the memory device to the magazine when the container is outside the player. When in the player, means detach the memory device from the magazine and connect the memory device into the player circuit. The magazine then can be moved while the memory device remains on-line and integrated into the player circuit irrespective of movement of the magazine.

BRIEF DESCRIPTION OF THE DRAWINGS

The invention will be described with reference to the figures, wherein.

DETAILED DESCRIPTION OF THE PREFERRED EMBODIMENT

Figure 1:
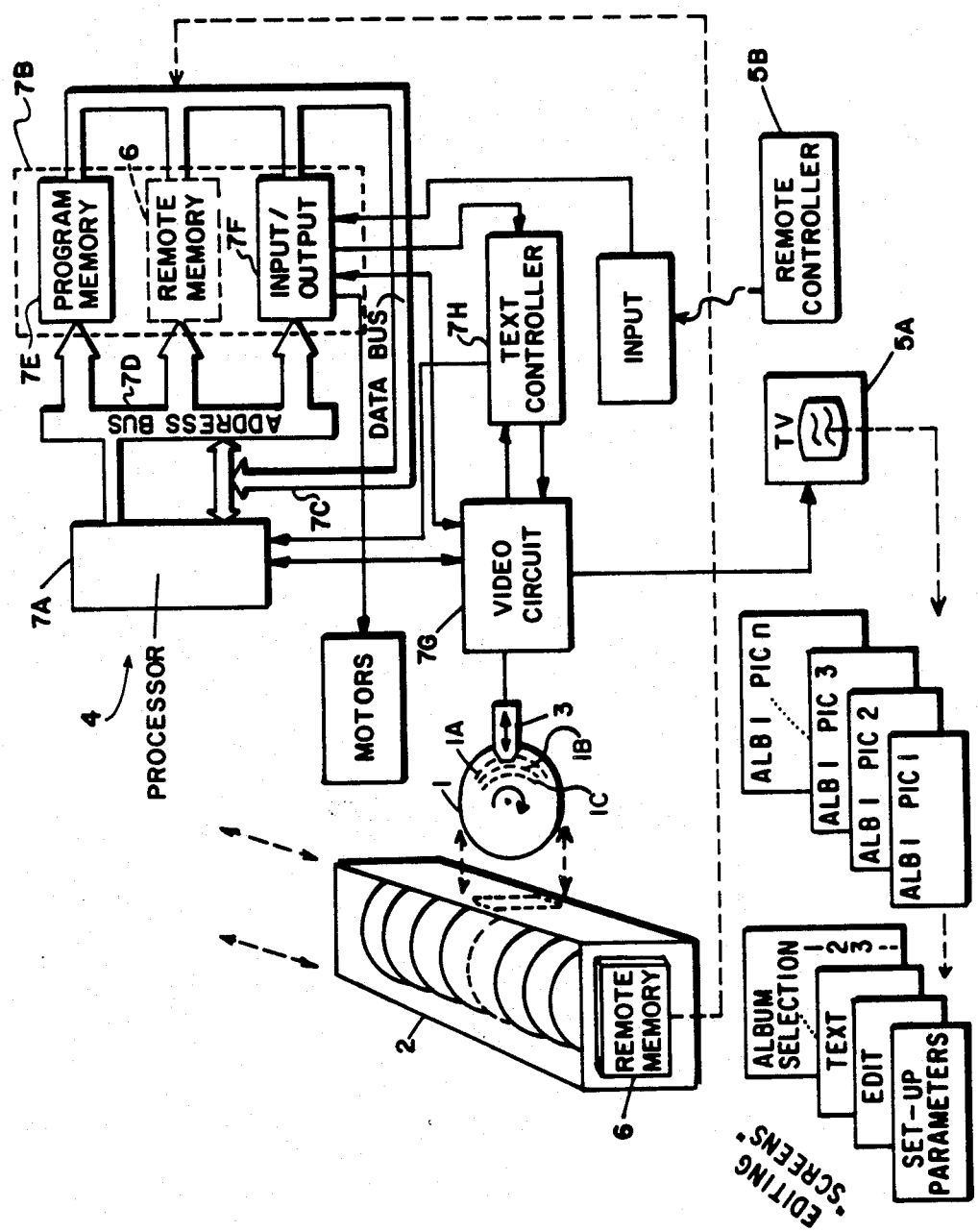
FIG. 1 is a schematic overview of video apparatus useful with a plurality of video disks.

It is helpful to initially consider a schematic overview of a video disk player useful with a plurality of video disks, particularly with video disks organized into a video picture file. Such a player is presented by FIG. 1 and also described in detail in related patent application Ser. No. 644,096. FIG. 1 shows a video disk 1 that has been automatically removed from a video disk tray 2. The disk may be optical or magnetic, rigid or floppy. The disk 1 has many concentric video tracks 1A, 1B, 1C . . . , each storing one picture (i.e., one field or one frame). A playback head 3 is seen adjacent one of these tracks. A player circuit 4, shown as a block diagram, not only reproduces each picture for display on a television 5A but also calls up the pictures—by moving one disk after another into the player—according to a particular arrangement prescribed by the video picture file. The video picture file provides for several, say twenty, categories or albums of like image content. Within each category, pictures may be rearranged as to order, be annotated with text, have different viewing times, and the like. In general the viewing experience is akin to being guided, with commentary, through a well-organized picture album.

Certain critical data necessary for quickly establishing this video picture file is contained in a remote memory 6 attached to the tray 2. This picture file data is initially obtained by editing the pictures, that is, by assigning some of the pictures to one or more albums by rearranging the viewing order (from the order on the disks), skipping some pictures, adding text to the assigned pictures, and so on. The viewer (who is editing the pictures) communicates with the player circuit 4 by observing editing "screens" on the television 5A that provide a guide to selections and then entering a decision via an infra-red remote controller 5B. The video picture file data is stored in the remote memory 6 and remains there though the tray 2 is removed from the player. To view an album, the tray 2 is inserted into the player and the remote memory 6 is connected into the player circuit 4. The viewer selects an album by observing album selection "screens" generated from the picture file data and pressing buttons on the controller 5B. The pictures are then obtained in a rearranged order according to the particular album by accessing the disks, and the picture tracks on the disks, in a rearranged sequence--that is, a sequence unlike the order of disks, and tracks on the disks, as stored in the tray 2. Viewing then proceeds automatically through the album with the viewer essentially unaware of the particular disks and tracks being accessed.

The player circuit 4 includes a digital processor 7A that operates by means of programs and data stored in a memory array 7B. The digital processor 7A includes a microcomputer, such as the 8031 microcomputer manufactured by the Intel Corporation. The 8031 microcomputer has 32 input/output (I/O) lines configured as four 8-bit parallel ports. One port connects to an 8-bit data bus 7C and provides for multiplexing both a low-order address byte and data onto the bus. The low-order address byte is latched off the data bus 7C and put on a 16-bit address bus 7D. The high-order address byte is provided by another 8-bit port to the address bus 7D. The memory array 7B includes a set of read-only memories (ROMs) 7E for storing the operating programs and a word library for text generation. Read and write memories include the aforementioned remote memory 6 and input/output (I/O) space 7F for memory-mapped I/O, that is, an area of memory space dedicated to memory addresses that are actually used to address peripherals (such as motors and sensors). Each memory in the array 7B is connected to the address bus 7D and to the data bus 7C.

A third port of the microcomputer interchanges data with a video circuit 7G, which processes video and control data either read from or written (i.e. applied) to the video disk 1. The processor 7A is also connected to a text controller 7H, which generates the aforementioned "screens". The processor 7A operates the player by coordinating signals from a variety of input sensors, including the remote controller 5B and the head 3, with commands to a variety of output devices, including the motors that move the magazine, remove the disk, position the head, and the like. The display to the television 5A is provided by the video circuit 7G, which switches between a picture signal from the head 3 and a text signal from the text controller 7H.

The key to avoiding response delay and providing a viable and attractive video picture file lies in the provision of the memory 6 and its quick incorporation into the memory array 7B of the player circuit 4. Having the critical data stored in the memory 6 not only avoids cycling through all the disks in the tray 2 but offers a concise data file for an elaborate editing capability spanning all the disks. This is particularly helpful when new sets of video pictures, on additional disks, are worked into the albums of the existing video picture file.

Figure 2:
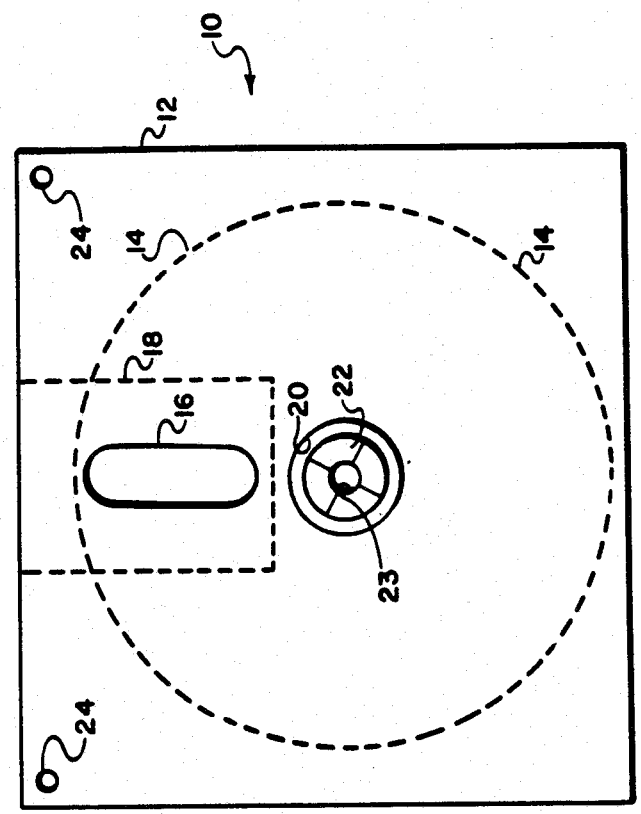
FIG. 2 is a view of a cartridge showing an enclosed magnetic video disk.

The video disk player preferably generates a video picture file from pictures stored on a plurality of magnetic video disks, each contained in a protective cartridge and assembled together in a container. A suitable cartridge 10 is shown by FIG. 2. The cartridge 10 includes a hard plastic shell 12 enclosing a magnetic floppy disk 14 (shown by broken line). A slot opening 16 in the shell 12 permits the playback head (such as the head 3 in FIG. 1) to contact a selected section of the magnetic disk 14. The cartridge may include an automatically closed shutter 18 which is opened in order to expose the surface of the magnetic disk 14 to the playback head. The shell 12 is also provided with a central aperture 20 that exposes an underlying hub 22 attached to the center of the magnetic disk 14. The hub has a central hole 23 for engaging a drive spindle of the player (which will be described later). It is also commonplace to have one or more alignment apertures, such as holes 24, in the shell 12.

When the cartridge is inserted into the player, alignment pins penetrate the holes 24 and the drive spindle engages the central hole 23, thereby centering the disk 14 with reference to the playback head. For purposes of the following description, the disk 14 has sufficient capacity for a plurality of, say 50, concentric picture tracks that are exposed through the slot opening 16.

Figure 3:
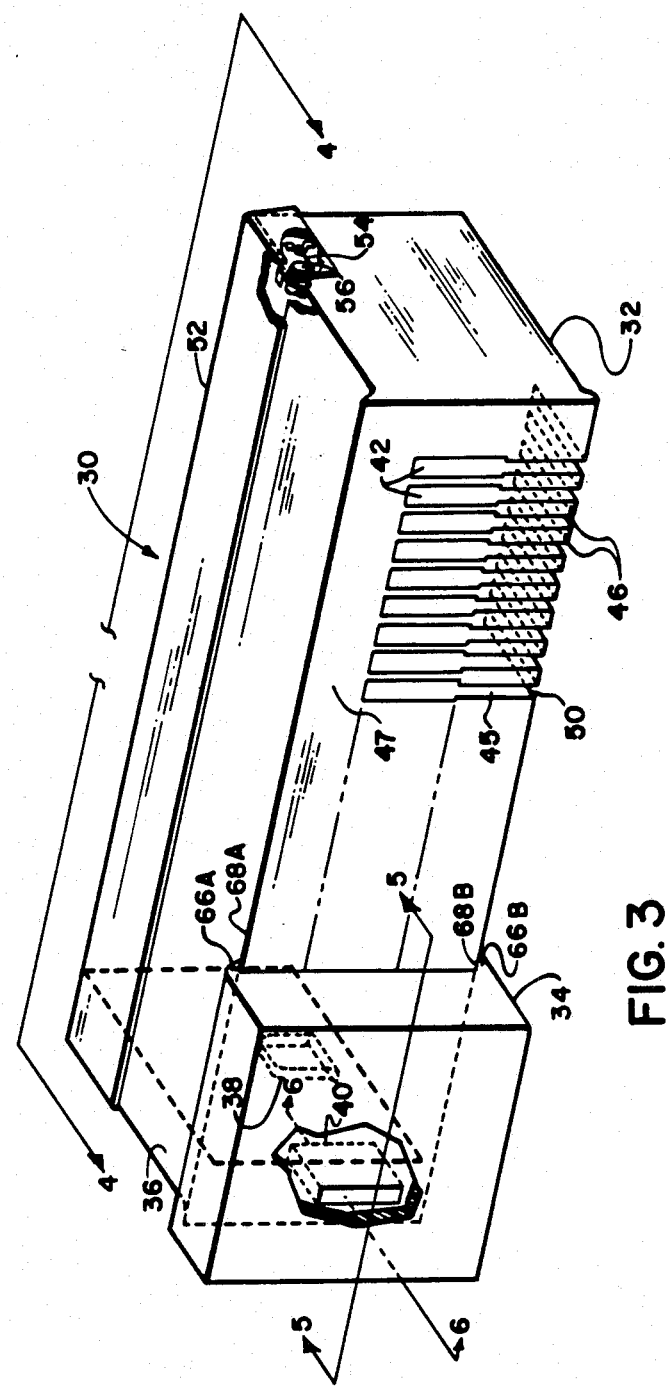
FIG. 3 is a perspective view of a magazine for a plurality of cartridges and an attached memory module according to a preferred embodiment of the invention.
Figure 4:
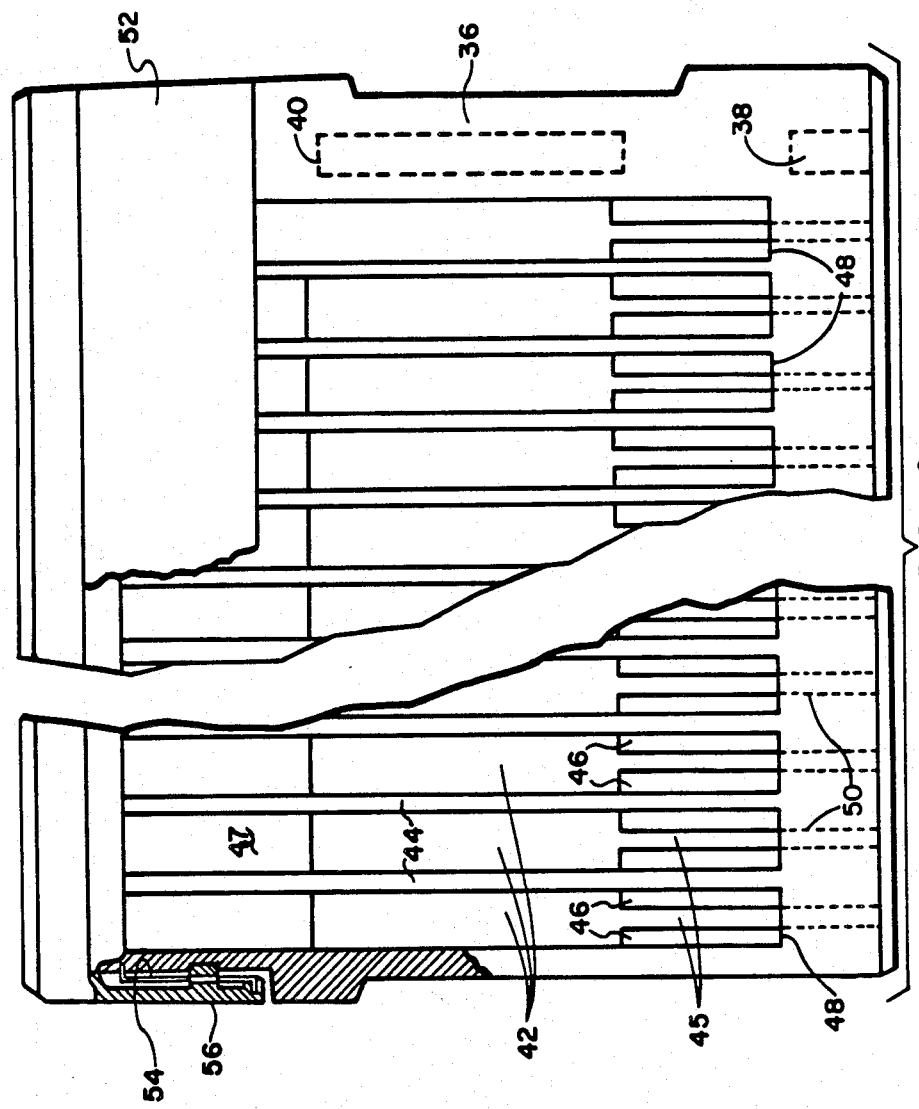
FIG. 4 is a sectional view of a portion of the magazine taken along a line 4—4 in FIG. 3.

FIG. 3 shows a multi-cartridge container 30 composed of a cartridge magazine 32 and a memory module 34 according to a preferred embodiment of the invention. The magazine 32 includes a chamber for containing 30 cartridges, though magazines of other sizes, say for 10 or 20 cartridges, may also be used. The following description should be read in connection with the sectional views of FIGS. 4, 5 and 6 as well as the perspective view of FIG. 3. Both the magazine 32 and the memory module 34 are molded of rigid plastic. The magazine 32 includes a thickened end 36 having two cut-away areas, a magazine drive slot 38 and a module locking slot 40. The interior of the magazine 32 is divided into 30 cartridge storage slots 42 (FIG. 3 shows only a few of these slots) separated by rigid plastic walls 44 that afford clearance for the cartridge shuttle (described later), the device that moves the cartridges in and out of the magazine 32. The rear of each slot 42 is narrowed toward the bottom by widened portions 46, leaving a narrowed slotted opening 45. The rear is completely closed at the top by a molded section 47 extending across the back of the magazine 32. The magazine has a raised floor 48 to support the cartridges. Part of the raised floor 48 toward the back of the magazine is cut away forming a slot opening 50 that joins with the narrowed slot opening 45 on the back of the magazine 32. The joined slot openings 45 and 50 leave just enough space in between to permit the bottom of the shuttle to enter. The cartridges are put in the magazine 32 from the front side designated in part by the line 4—4 (FIG. 3) when a cover 52 is lifted. The cover 52 is biased in a closed position by a spring 54 coiled around a pivot pin 56 of the cover 52 and anchored at opposite ends to the magazine body and the cover 52. The cartridges are prevented from falling out the back and bottom of the magazine by the section 47 and the walls forming the narrowed slot openings 45 and 50.

Figure 5:
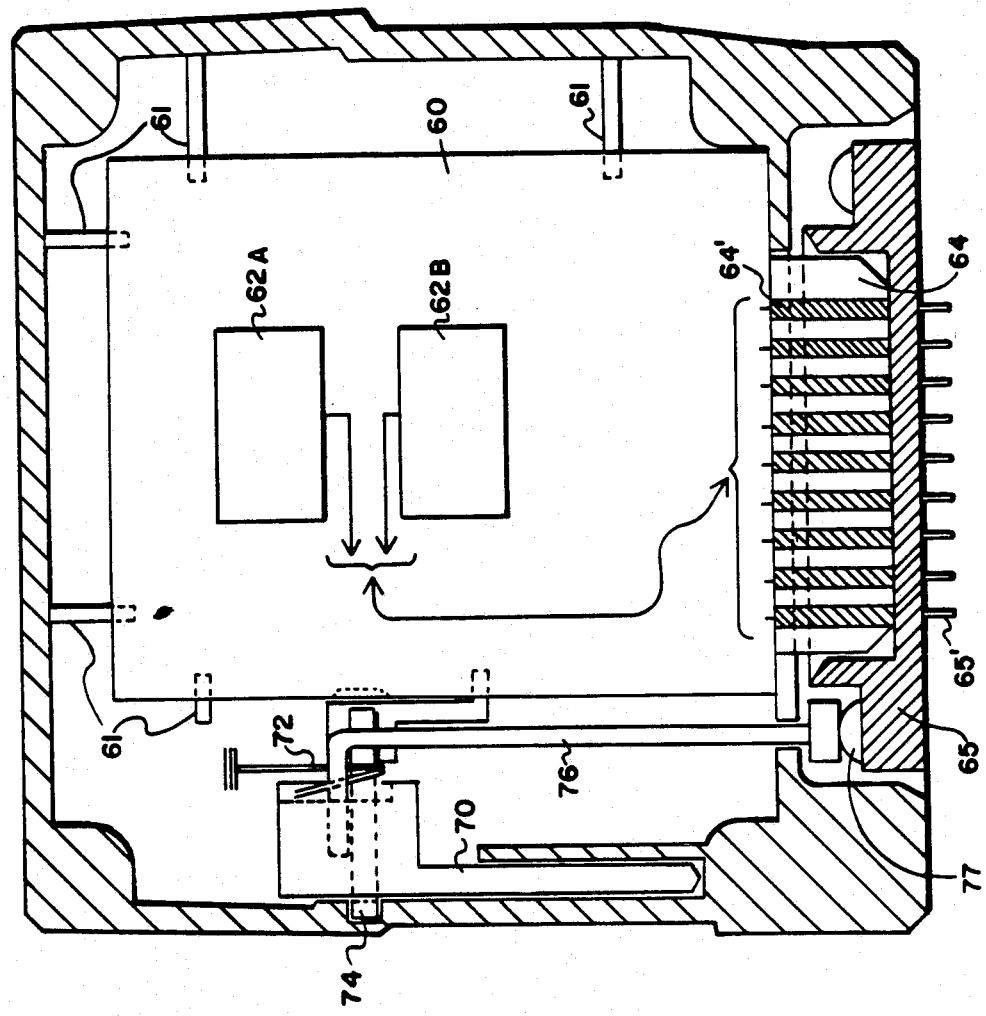
FIG. 5 is a sectional view through the memory module taken along a line 5—5 in FIG. 3.

The memory module 34 is a container for a circuit board 60 (best seen in FIG. 5) held in place by lugs 61 molded into the module 34. One or more solid state memory devices 62 (A, B, C . . . ) are mounted on the circuit board 60. In the preferred embodiment, two memory devices 62A and B are provided. Each memory device 62 is an electrically erasable programmable read-only memory (EEPROM). Such memory devices are well-known and can be programmed, electrically erased by the programmer, and reprogrammed. Depending on the capacity needed for the memory module 34, the EEPROMs 62A and 62B may have a capacity of $2k \times 8$ (provided, for example, by a Xicor X2816A device) or $8k \times 8$ (provided, for example, by a Xicor X2864A device). The signal and power leads from the devices 62A and B are brought out to a conventional edge connector 64, which is shown in FIG. 5 mated with a complementary socket 65 located in the player. The edge connector 64 has a series of metallic contacts 64' which meet similar contacts in the socket 65 that terminate in a series of external leads 65'. The player circuit 4 (see FIG. 1) connects to the leads 65' thereby incorporating the memory devices 62A and B into the memory array 7B.

Figure 6B:
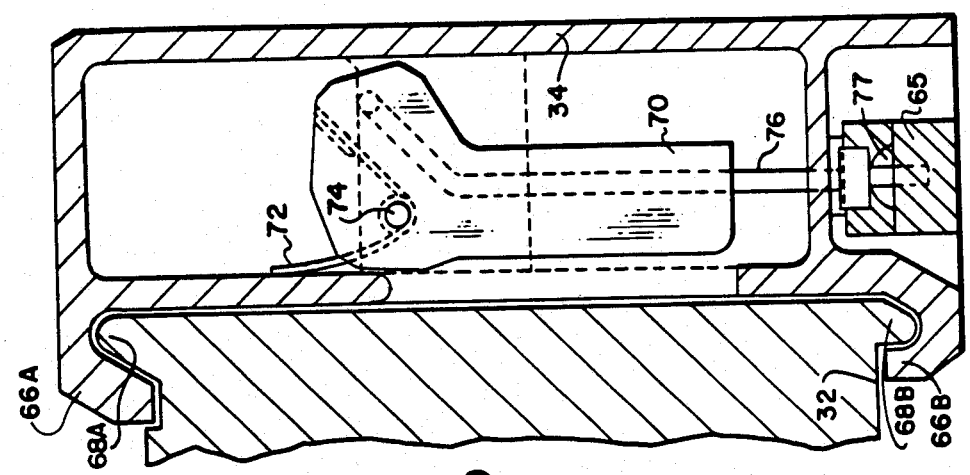
FIGS. 6A and 6B are sectional views through the memory module and a portion of the magazine taken along line 6—6 in FIG. 3, showing both the locked condition (FIG. 6A) when the magazine and memory module are removed from the video player and the unlocked condition when they are placed in the player (FIG. 6B)
Figure 6A:
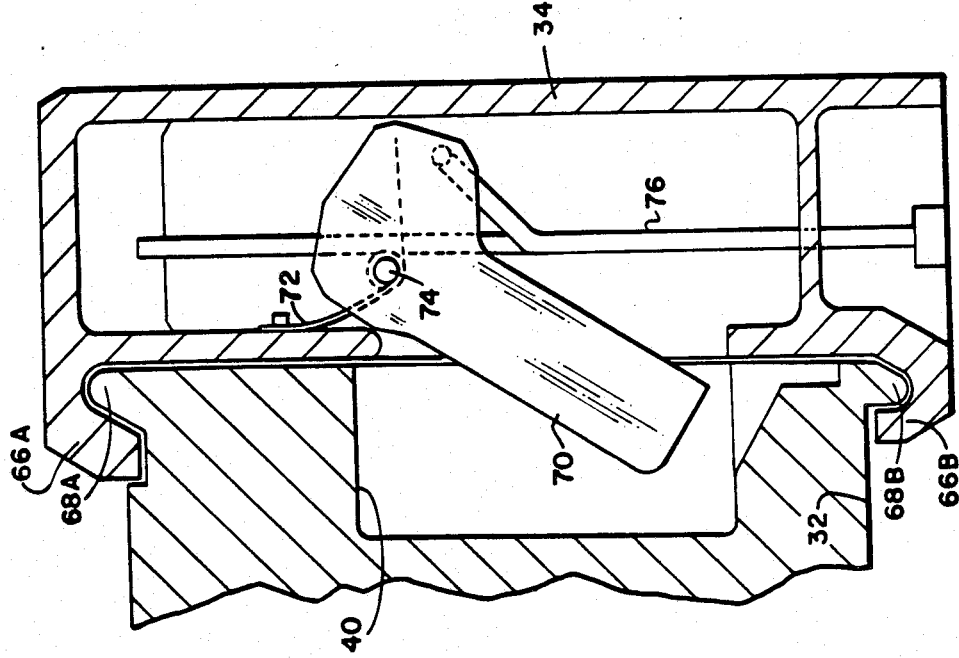

The memory module 34 is supported adjacent the magazine 32 by a pair of projecting flanges 66A and 66B which conform to, and overhang, a pair of complementary guide rails 68A and 68B formed along the back length of the magazine 32. The memory module 34 can be locked in place to the magazine 32, in the position shown by FIG. 3, by a locking key 70 that is biased into the locking slot 40 by a spring 72 coiled around a pivot pin 74 and anchored at opposite ends to the module 34 and the key 70. FIG. 6A shows the key 70 in its locked position, which prevents movement of the magazine 32 with respect to the module 34. An unlocking plunger 76 hangs from one end of the key 70. FIG. 6B shows the unlocked position when the module 34 is placed into the player; then the plunger 76 is forced into the module 34 as its end encounters a mounting bolt 77 for the socket 65. In the unlocked position illustrated by FIG. 6B, the memory module 34 is detached from the magazine 32 and can be moved with respect to the magazine 32 along the rails 68A and 68B. In the preferred embodiment, the memory module 34 is detached from the magazine 32 and immobilized with respect to the player. The magazine 32 is then free to slide adjacent the module 34 and along its projecting flanges 66A and 66B; meanwhile, the memory devices 62A and 62B are maintained on-line in the memory array 7B irrespective of movement of the magazine 32. Furthermore, as will be described, it is possible for the magazine 32 to completely disassociate itself from the module 34 by sliding so far that it is no longer between the projecting flanges 66A and 66B; and, though completely disassociated from the magazine, the memory devices 62A and 62B still remain on-line.

Figure 7:
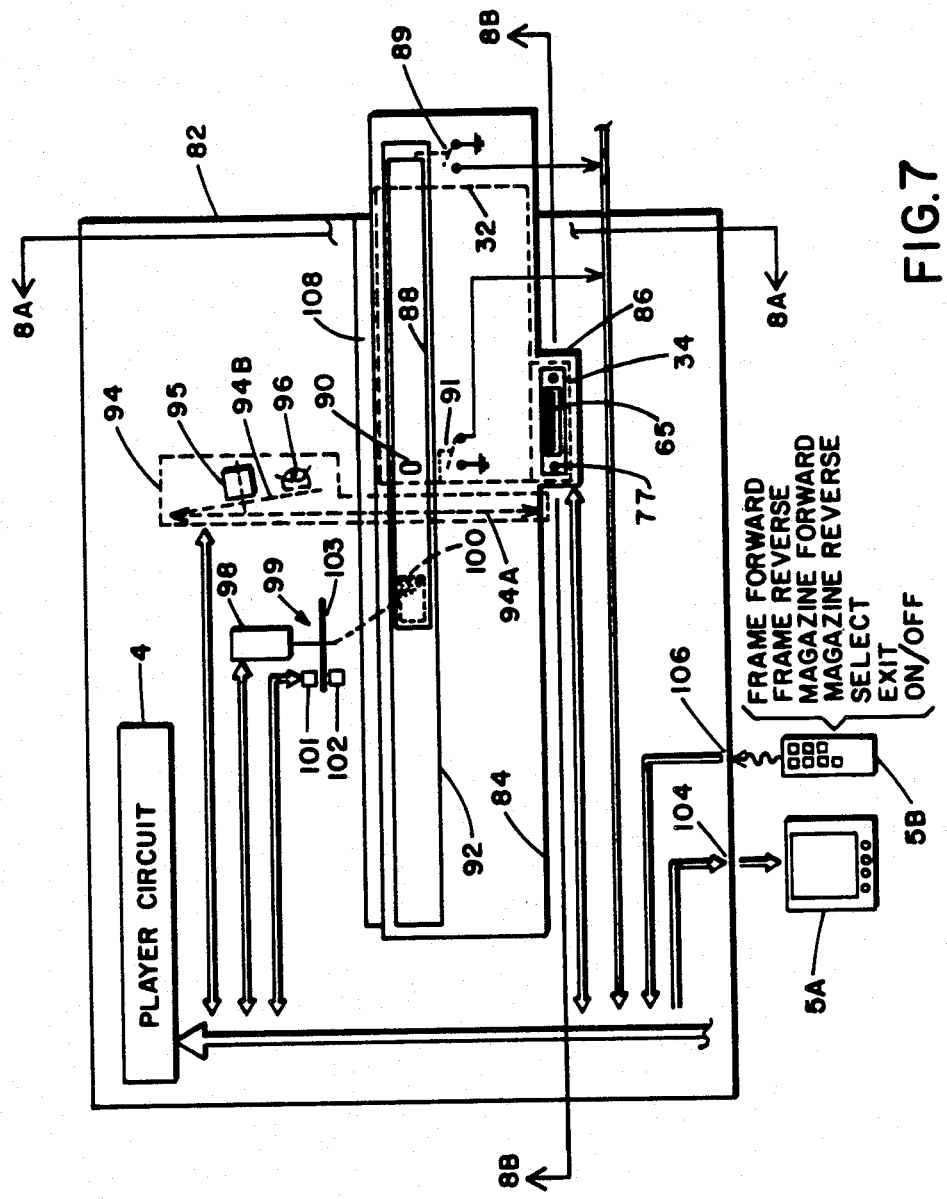
FIG. 7 is a partially schematic plan view of a video disk player useful with the preferred embodiment of to the invention.
Figure 8A:
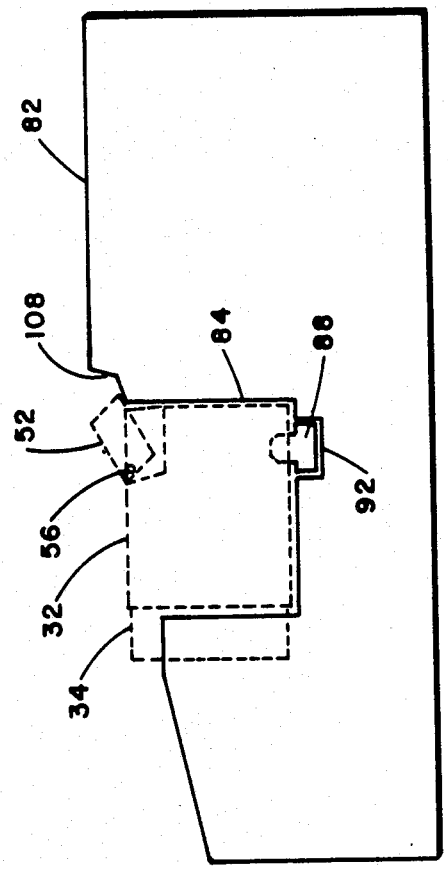
FIG. 8A and 8B are sectional views of the video player taken along lines 8A—8A and 8B—8B in FIG. 7.
Figure 8B:
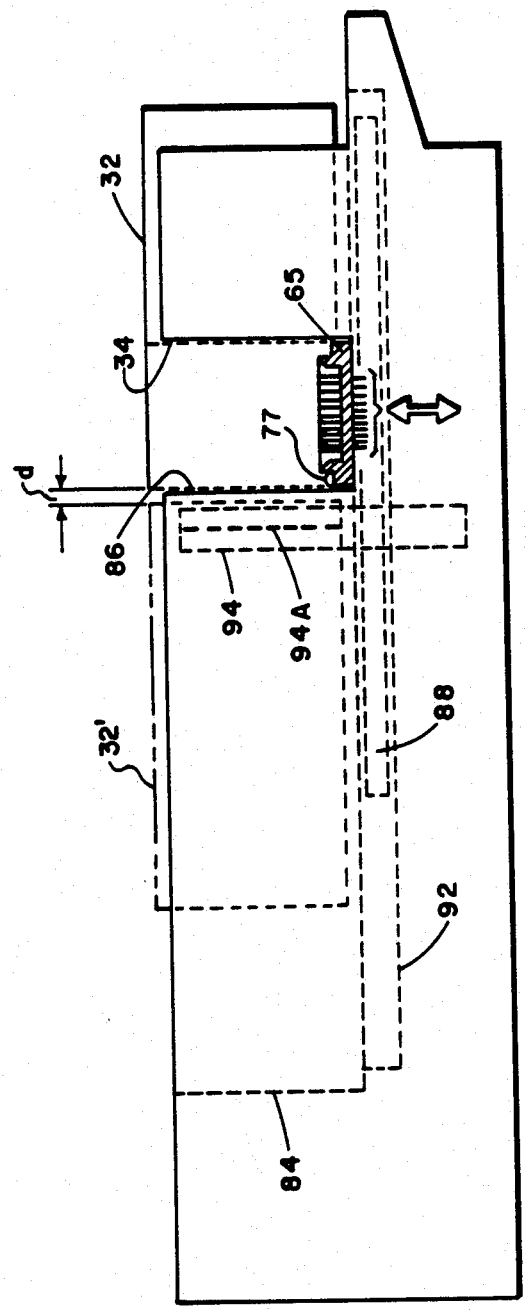

The magazine 32 and the module 34 are intended for use in a video disk player of the type illustrated, in plan view, by FIG. 7 and, in sectional views, by FIGS. 8A and 8B. FIG. 7 is a partially schematic view in that it shows both the player circuit 4 with its input and output connections and an outline of the physical enclosure 82 of the player and certain other physical parts that cooperate with the magazine 32 and the memory module 34. Looking first within the enclosure 82, it includes a channel 84 for receiving the magazine 32, shown here by broken line. One side of the channel 84 is formed into a receptacle 86 for receiving the memory module 34, also shown here by broken line. (The socket 65 and the mounting bolt 77 are shown at the base of the receptacle 86.) The magazine sits atop an elongated rack 88 having a geared underside. Before loading the magazine 32 into the player, the rack 88 is repositioned until it trips a switch 89, indicating to the circuit 4 that it is in position to receive a magazine 32. With the rack 88 so positioned, the magazine drive slot 38 receives a locating nub 90 on the rack 88 when the magazine 32 is placed into the channel 84 (see especially FIG. 10). At the same time the memory module 34 slips into the receptacle 86 and engages the socket 65. The mounting bolt 77 forces the plunger 76 upward, moving the key 70 out of the locking slot 40. With the magazine 32 in place and the memory module 34 detached from the magazine, the rack 88 is conditioned for movement, and the magazine 32 therewith, along a track 92. (The locating nub 90 serves as the drive connection between the rack 88 and the magazine 32). A switch 91 is tripped when the rack 88 moves the magazine 32 its maximum distance into the player, indicating to the circuit 4 that the last cartridge is ready for access. At this point, the magazine 32 has moved so far that it is completely disassociated from the module 34, as indicated by the broken line position 32' of the magazine in the sectional view of FIG. 8B. As shown there, the position 32' of the magazine is a distance d from the module 34.

The player circuit 4 (FIG. 7) is connected to several parts of the video disk player. One connection is to a shuttle transport and disk drive assembly 94, which removes a cartridge 10 from the magazine 32 and moves it into the player along the path 94A. There it is pivoted (until aligned to path 94B) so that the hub 22 of the disk engages the spindle of a drive motor 95 and the slot opening 16 receives a playback head 96. The circuit 4 also communicates control signals to and from a magazine drive motor 98 and a motion sensor 99, which detects operation of the motor 98. The drive motor 98 connects by reduction gearing to a pinion gear 100, which drives the magazine rack 88. The motion sensor 99 includes a chopper wheel 103 interposed between a photosensor 101 and a photoemitter 102. Pulse signals from the photosensor 101 correlate to movement of the rack 88 and the magazine 32 therewith. The player circuit 4 also receives magazine position signals from the switches 89 and 91. The circuit 4 further connects with the EEPROM memory devices 62A and 62B in the memory module 34 by way of the socket 65.

The remaining circuit connections are directed to input/output terminals 104 and 106. The television 5A is connected to terminal 104 for viewing pictures and data retrieved from the magnetic disk 14 and the EEPROM devices 62A and 62B. The remote controller 5B is coupled, by infra-red radiation, to the terminal 106. The following named buttons are located on the controller:

Frame Forward
Frame Reverse
Magazine Forward
Magazine Reverse
Select
Exit
On/Off Pressing one of these buttons on the controller 5B applies a corresponding infrared signal to the terminal 106, which includes an infra-red sensor and decoder. From there the decoded signal is conveyed to the player circuit 4.

The sectional view of FIG. 8A shows that the enclosure 82 has a beveled seat 108 which catches an edge of the cover 52 when the magazine 32 is placed into the channel 84. The cover 52 pivots around the pin 56, thus fully opening the cartridge storage slots 42 to the player and permitting the cartridges 10 to be pushed from the magazine 32. For this to happen the magazine 32 is advanced forword—by driving the rack 88—until the desired cartridge storage slot 42 is aligned with the shuttle path 94A. Then the cartridge is removed from the magazine 32 and moved into the video disk player adjacent the head 96 for playback.

Figure 9:
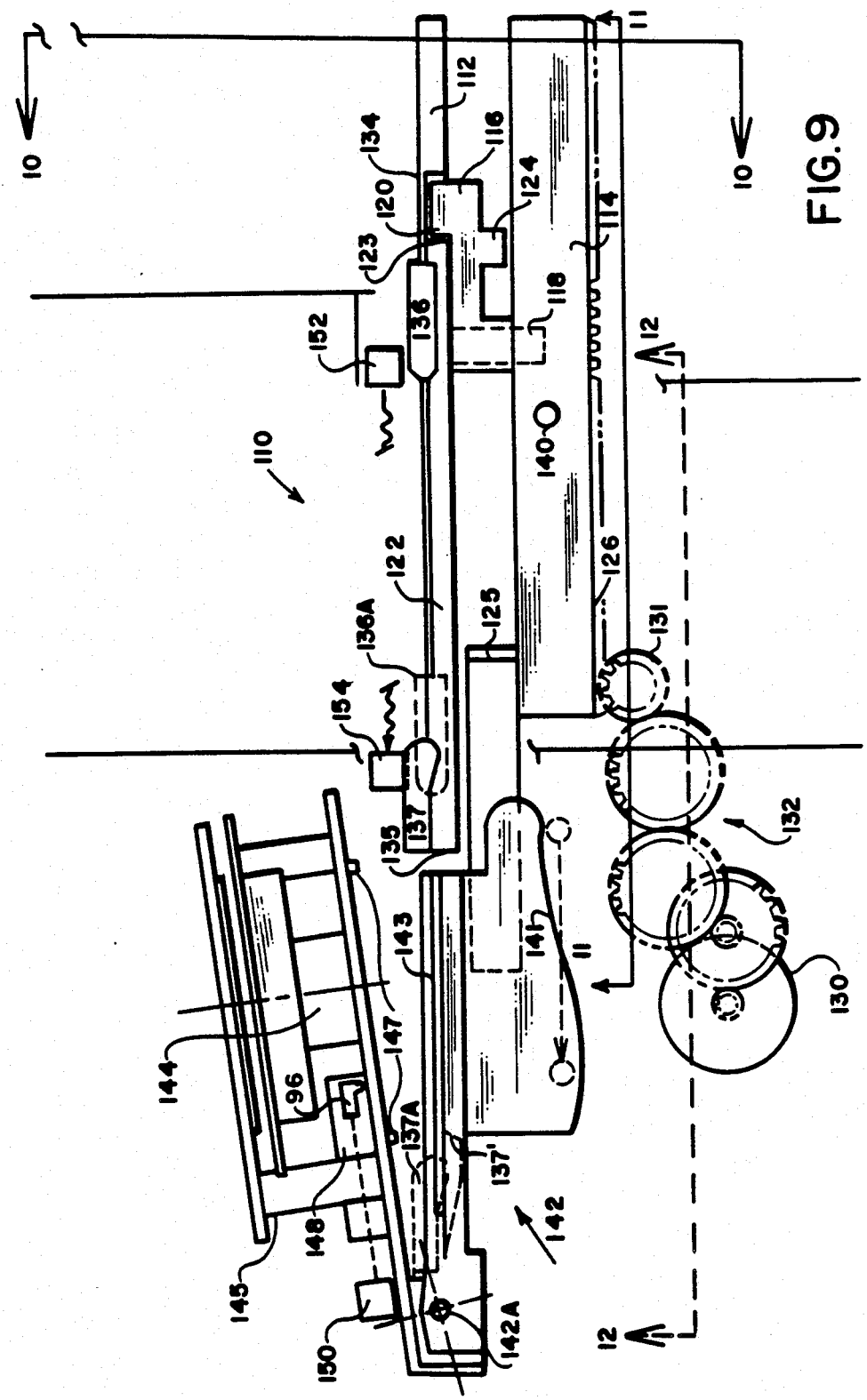
FIG. 9 is a detail plan view of the cartridge shuttle and disk drive shown as part of FIG. 7.
Figure 10:
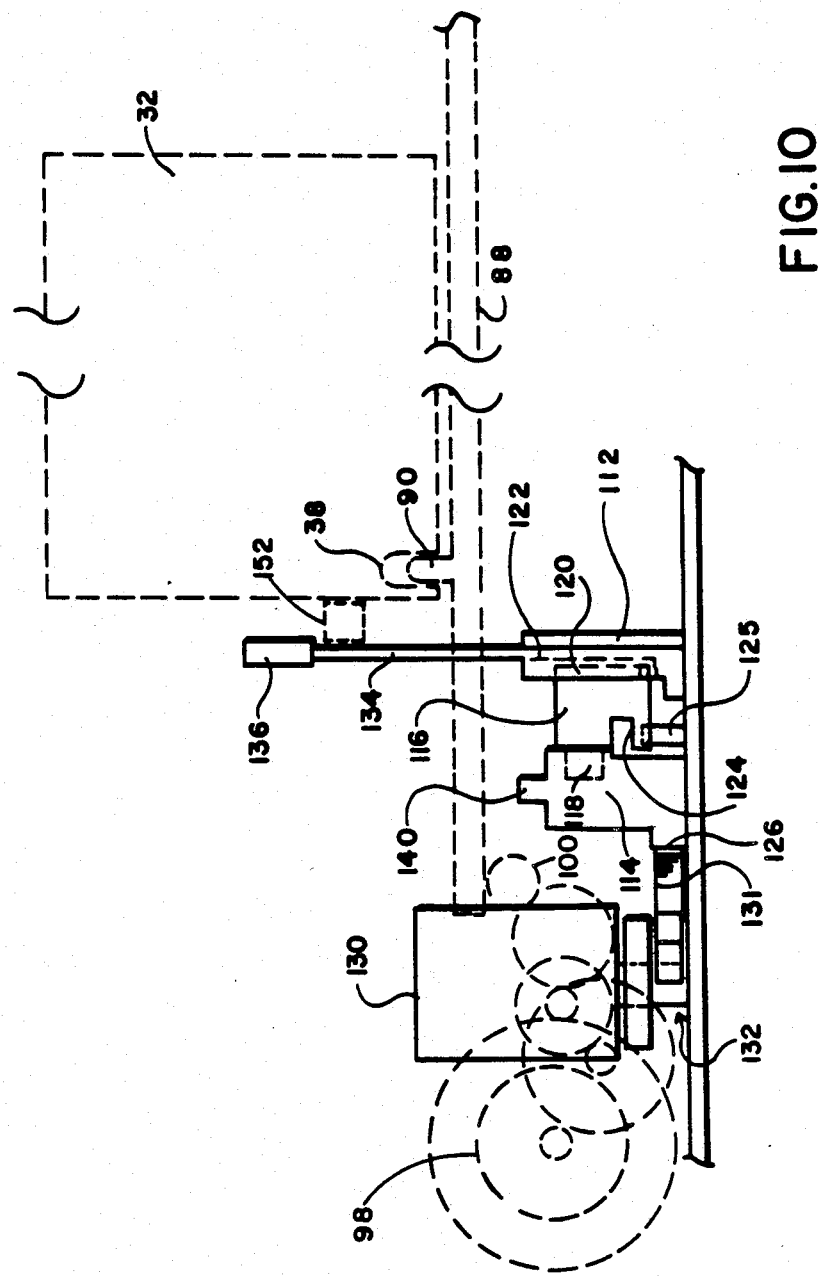
FIG. 10 is a sectional view mainly of the shuttle taken along a line 10—10 of FIG. 9, showing also the relative position of the magazine.

FIGS. 9 and 10 are detail plan and elevation views, respectively, of the mechanism included within the shuttle transport and disk drive assembly 94 for moving a cartridge out of the magazine 32. Looking first at the shuttle portion 110, it is composed of a first slider 112 and a second slider 114 interconnected by a pivotable latch 116. The latch 116 pivots about a pivot pin 118 and has, at its other end, a hook 120. The first slider 112 has a cavity 122 cut away from one side. The part of the cavity 122 adjacent the hook end 120 of the latch 116 has a notch 123 that engages the hook 120. In the space between sliders 112 and 114 the latch 116 has a bevel edge 124 that, in operation, cooperates with a camming block 125. One side of the slider 114 is formed into a rack gear 126. A shuttle drive motor 130 is connected to a pinion gear 131 by way of a set of reduction gears 132. The pinion gear 131 mates with the rack gear 126. The rotation of the pinion gear 131 causes the movement of the second slider 114 and, by means of the latch 116, the first slider 112.

Figure 11:
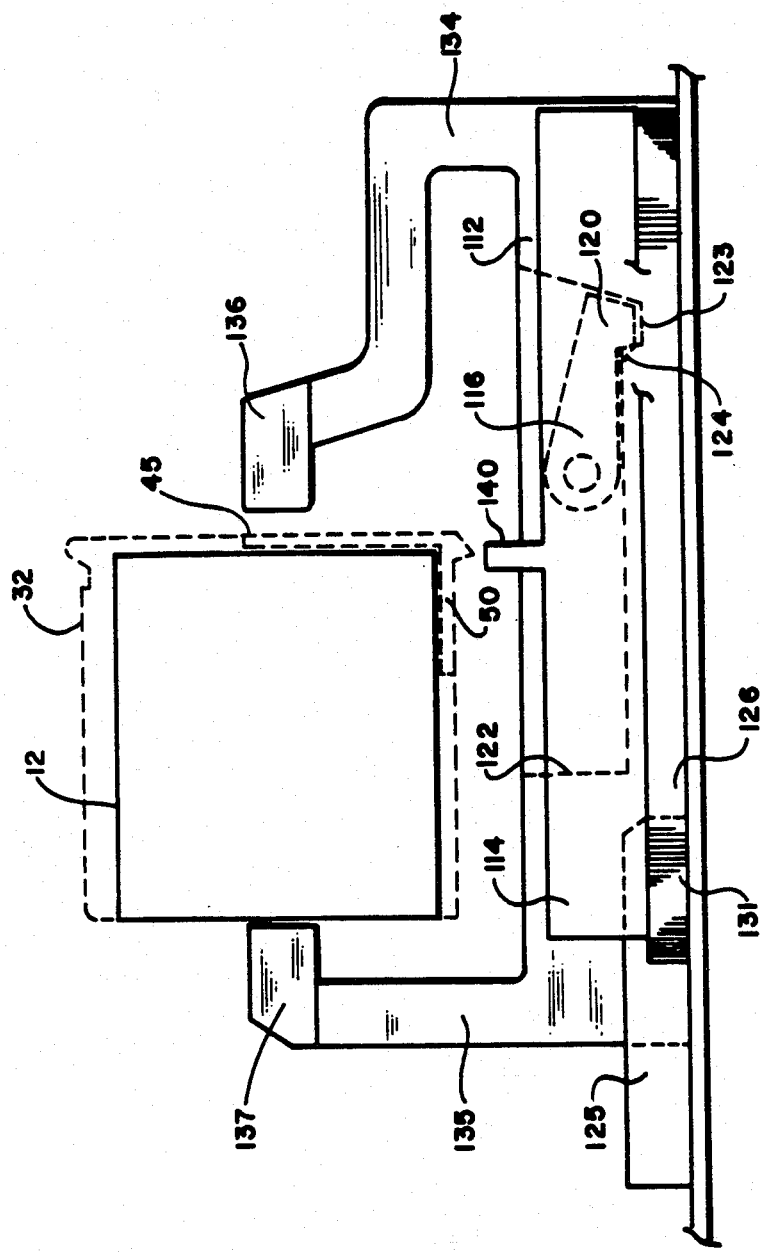
FIG. 11 is a sectional side elevation of the shuttle taken along a line 11—11 of FIG. 9, showing the home position of the shuttle relative to the magazine before a cartridge has been removed.
Figure 12:
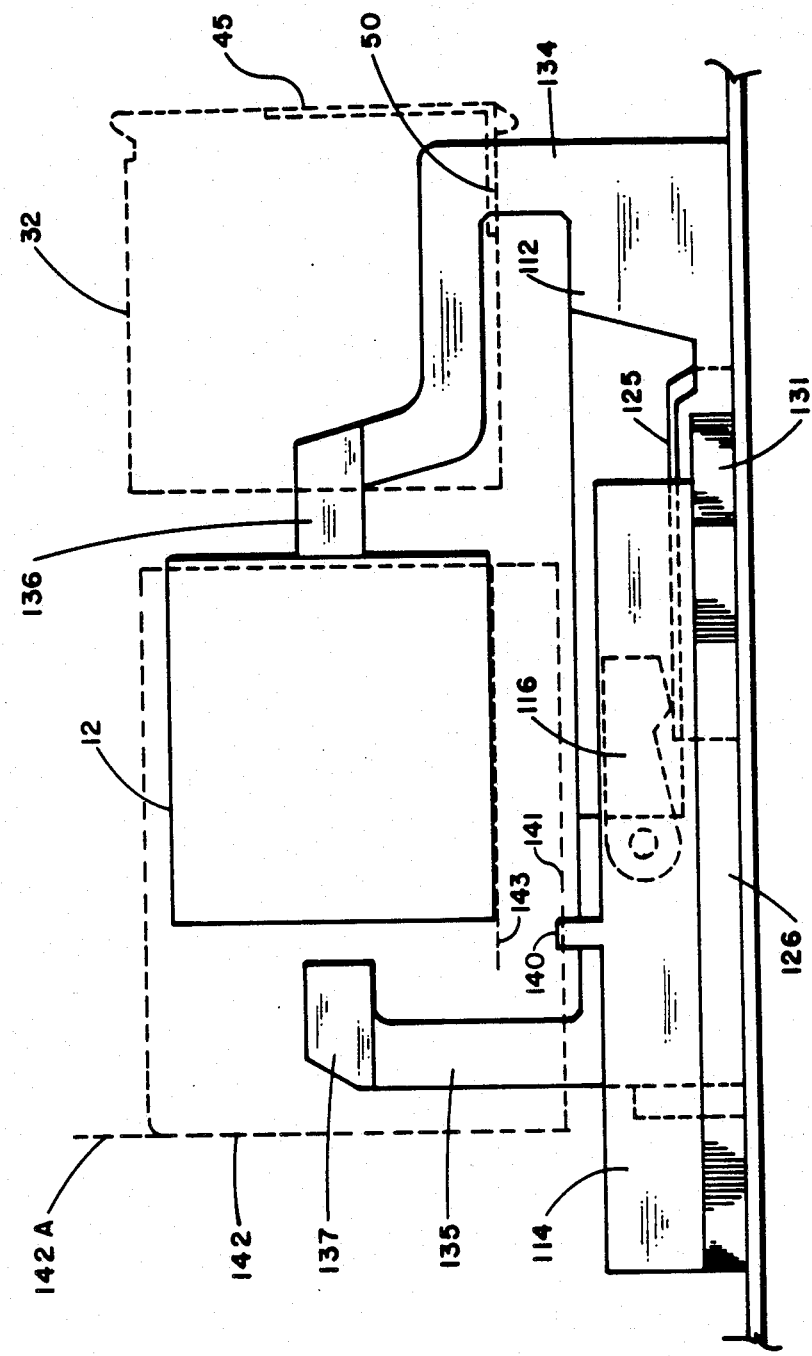
FIG. 12 is a sectional side elevation of the shuttle taken along a broken line 12—12 of FIG. 9, showing the pre-play position of the shuttle relative to the magazine after a cartridge has been removed.

As also seen in FIGS. 11 and 12, the first slider 112 includes a fore blade 134 and an aft blade 135 on which are mounted respective fore and aft pushers 136 and 137. Each pusher has a shaped nose that is adapted to push the cartridge, either from the magazine 32 into a door assembly 142 (shown also by FIG. 9) or from the door assembly 142 back into the magazine. The door assembly 142, which pivots about an axis 142A, is biased (by means not shown) into the position shown in FIG. 9. When pivoted, the door assembly 142 moves the cartridge into the playing position depicted as path 94B in FIG. 7. The door assembly 142 is arranged in such a position, as shown by broken line in FIG. 12, that it clears both sliders 112 and 114 and the pusher nose 136. A cavity 137' is cut into the door assembly 142 (as shown by FIG. 9) to accommodate the other pusher nose 137 and the aft blade 135 when the door assembly 142 is fully pivoted.

The second slider 114 also includes a camming pin 140 which is positioned so that, in operation, it engages a camming surface 141 of the pivotable door assembly 142. The door assembly 142 includes a cartridge track 143 aligned with the floor 48 of the magazine 32. A hub motor 144 is mounted on a rigid support 145 at a few degrees with respect to the door assembly 142. One or more alignment pins 147 protrude from the support 145 for engagement with the alignment holes 24 in the cartridge 10 (see FIG. 2). The playback head 96 is mounted on a head carriage 148 which displaces the head 96 from track to track on the magnetic disk 14. The carriage 148 is connected with a positioner motor 150 by, for example, a lead screw, band positioner, cam drive or the like. The disk drive and head positioner components 144–150 are conventional devices whose selection, installation and operation are within the ordinary skill of one engaged in this art.

When the magazine 32 and its associated memory module 34 are placed into the channel 84 of the player, the switch 91 is tripped. This indicates to the player circuit 4 that a magazine is in place. The magazine 32 is first automatically moved through its full length. While moving, the cartridge storage slots 42 of the magazine pass between a photosensor 152 and a photoreceiver 154 shown in FIG. 9. The signal from the photoreceiver 154 is used to poll the magazine, seeing which slots have cartridges present and which do not. This information is used by the player circuit 4 to validate the data in the memory module 34 concerning which cartridge storage slots 42 are filled with cartridges. The magazine is then brought back to a starting position where the first cartridge slot 42 is lined up along the shuttle path 94A (FIG. 7) and between the noses of the pushers 136 and 137 on the shuttle 110. A side elevation of this position is seen in FIG. 11.

The operation of the shuttle transport and disk drive assembly 94 is as follows. The shuttle motor 130 is started, moving the second slider 114 and the first slider 112 therewith. The pusher 136, attached to the first slider 112, begins to push the cartridge out of the magazine. It is shown by FIGS. 11 and 12 how the shuttle 110 passes into the magazine 32 in order to remove a cartridge. In particular, the pusher 136 enters the wider part of the cartridge storage slot 42, as best shown by FIG. 3. The fore blade 134 enters first the narrowed slot opening 45 and, later in its travel, also enters the narrowed slot opening 50 on the bottom of the magazine. The pusher 136 ultimately pushes the cartridge to a pre-play position at which the cartridge is upon the cartridge track 143 and opposite—but still offset a few degrees from—the hub motor 144 and the playback head 96. The pre-play position is seen in FIG. 9 by the unpivoted position of the door assembly 142. At this point, with the motor 130 continuing to drive the second slider 114, the bevel edge 124 of the latch 116 rides up and over the camming surface of the block 125. With the latch 116 pivoted upward, its hook end 120 rides loose from the first slider 112. The first slider 112, along with its blades 134 and 135 and pushers 136 and 137, stops.

Meanwhile, the second slider 114 continues to advance, forcing the camming pin 140 into engagement with the camming surface 141 of the door assembly 142. The slider 114 advances further until the camming pin 140 forces the door assembly 142 to pivot toward the hub motor 144, permitting the spindle (not shown) of the disk drive 144 to positively engage the hub 22 of the disk 14 (FIG. 2). The alignment pins 147 simultaneously position the disk 14 relative to the playback head 96. A suitable switch (not shown) is provided to signal the circuit 4 that the shuttle drive motor 130 should be turned off and that the disk 14 is ready for playback. (If the cartridge has the shutter 18, a suitable detent is provided to catch the top of the shutter and open it, for example, as the cartridge is pushed into the door assembly 142). The operation is reversed in order back the cartridge off the disk drive 144 and push it back into the magazine 32. Another switch (not shown) may be provided to show that the shuttle 110 is in its home position (FIG. 11), and the cartridge is back in the magazine 32. Then the magazine drive motor 98 can be turned on and the rack 88, and the magazine 32 therewith, advanced to a new position relative the shuttle 110.

Further details regarding the player circuit 4 are provided in the aforementioned, related Ser. No. 644,096. In particular related Ser. No. 644,096 discloses a video file operating system for implementing the player circuit 4. This system steps the viewer through a prearranged sequence of operations. Several modes of operation are available, including the "set-up" mode, the "edit" mode, the "album viewing" mode and the "normal viewing" mode. Each mode interacts the viewer with the video file operating system. The description of the various modes constitutes a list of requirements for the video file operating system, that is, a specification for the system. Details regarding this specification are also set out in related Ser. No. 644,096.

The invention has been described in detail with particular references to a presently preferred embodiment thereof, but it will be understood that variations and modifications can be effected within the spirit and scope of the invention. For example, the memory module 34 and the magazine 32 are shown supported for relative movement by cooperation between the pair of flanges 66A and 66B and the complementary guide rails 68A and 68B. It is clear that this particular arrangement is exemplary of any shaped structure on the module 34 which conforms to a corresponding guiding surface on the magazine 32 such that the module 34 and magazine 32 may assume a variety of positions with respect to each other. Furthermore, though the magazine 32 is shown as an elongated tray, it may take other forms (such as a circular "carousel" tray) and be adapted for use according to the invention.

What is claimed is:

1. A container for holding a plurality of magnetic disks, each storing data that may be read and processed by a playback circuit in a magnetic disk player, said container comprising:
   a magazine for containing a plurality of magnetic disks;
   a memory device supported adjacent said magazine;
   means for securely attaching said memory device to said magazine when the container is apart from the player; and
   means responsive to insertion of the container into the player for detaching said memory device from said magazine and connecting said memory device into the player circuit, said magazine being then capable of movement relative to said memory device while said memory device remains on-line and integrated into the player circuit irrespective of movement of said magazine.

2. A removable container for holding a plurality of magnetic disks each storing data that is read and processed by a playback circuit in a magnetic disk player, said container comprising:
   an elongated magazine for storing a plurality of magnetic disks in separate compartments such that a selected disk may be withdrawn by the player without disturbing the remaining disks;
   an erasable, non-volatile memory device supported adjacent a side of said magazine for storing supplementary data related to data stored on the disks;
   means for securely fastening said memory device to said magazine when the container is removed from the player;
   means responsive to insertion of the container into the player for unfastening said memory device from said magazine thereby permitting said magazine to move relative to said memory device so that a selected disk may be withdrawn; and
   means for incorporating said unfastened memory device into the playback circuit when the container is inserted into the player so that the supplementary data is made available during processing of the data from a selected disk.

3. A removable container for storing a plurality of video disks each containing a series of prerecorded pictures that are played back by means of a circuit in a video disk player into which the container is inserted, said container comprising:
   a magazine for containing the plurality of video disks;
   a memory device supported adjacent said magazine for storing data related to the prerecorded pictures on the disks in said magazine;
   means for securely attaching said memory device to said magazine when the container is outside the player; and means responsive to insertion of the container into the player for incorporating said memory device into the player circuit while detaching said memory device from said magazine, whereby the data in said memory device is continuously available to the player circuit in connection with the playback of pictures from the video disks irrespective of movement of said magazine.

4. A container as claimed in claim 3 in which said magazine additionally comprises a pair of guide rails formed adjacent one side thereof and said memory device additionally comprises a pair of flanges that engage said guide rails and thereby support the memory device adjacent said magazine.

5. A container as claimed in claim 4 in which said magazine additionally comprises a locking slot and said means for securely attaching said memory device to said magazine additionally comprises a displaceable key attached to said memory device and biased into said locking slot to prevent movement of said memory device along said guide rails.

6. A container as claimed in claim 5 in which said means responsive to insertion of the container into the player additionally comprises means for displacing said key out of said locking slot when said magazine is inserted into the player, thereby permitting movement of said magazine relative to said memory device.

7. A removable container for holding a plurality of magnetic video disks each storing signals representing a series of prerecorded pictures that are reproduced by a video disk player and processed into a display signal by a digital processor that operates by means of programs and data stored in a memory array, said container comprising:
 a magazine for containing the plurality of video disks in separate compartments from which a selected disk may be withdrawn by the player;
 an erasable, non-volatile memory device for storing data relating to an organized arrangement for viewing the pictures;
 means for supporting said memory device for movement alongside said magazine;
 means for locking said supporting means to said magazine when the container is outside the player; and
 means responsive to placement of the container into the player (A) for unlocking said supporting means and freeing said magazine and memory device for relative movement and (B) for connecting said memory device into the memory array of the digital processor whereby the data relating to an organized viewing arrangement is continuously available to the playback circuit irrespective of movement of said magazine.

* * * * *